United States Patent [19]

Takamura

[11] 4,391,566

[45] Jul. 5, 1983

[54] DIFFUSER AND EXHAUST GAS COLLECTOR ARRANGEMENT

[75] Inventor: Tousaku Takamura, Yokohama, Japan

[73] Assignee: Nissan Motor Co., Ltd., Yokohama, Japan

[21] Appl. No.: 203,381

[22] Filed: Nov. 3, 1980

[30] Foreign Application Priority Data

Nov. 14, 1979 [JP] Japan ............................ 54-146444

[51] Int. Cl.³ ..................... F01D 25/30; F04D 29/44
[52] U.S. Cl. ................................ 415/209; 415/210; 415/216; 415/DIG. 1
[58] Field of Search ................ 415/209, 210, DIG. 1, 415/216

[56] References Cited

U.S. PATENT DOCUMENTS

| 3,149,470 | 9/1964 | Herzog ............................ 60/64 |
| 3,690,786 | 9/1972 | Silvestri, Jr. ........................ 415/421 |
| 4,013,378 | 3/1977 | Herzog ............................ 415/209 |
| 4,149,826 | 4/1979 | Torstenfelt . |

FOREIGN PATENT DOCUMENTS

| 1110063 | 2/1956 | France . |
| 2345592 | 10/1977 | France . |
| 52-43007 | 4/1977 | Japan ............................ 415/209 |
| 86087 | 7/1957 | Netherlands ........................ 415/210 |
| WO80/00989 | 5/1980 | PCT Int'l Appl. ................ 415/209 |
| 561692 | 5/1944 | United Kingdom . |
| 695212 | 8/1953 | United Kingdom . |
| 104568 | 10/1966 | United Kingdom . |
| 1454861 | 11/1976 | United Kingdom . |

OTHER PUBLICATIONS

Sultzer Tech. Review, V. Beglinger, et al. "Primo-the New Sultzer Lightweight Gas Turbine Family . . .", 3/78, pp. 109–118.
Gas Turbine World, May 1978, "Sultzer's New Primo Series . . .", by Victor de Biasi, pp. 38–40.

*Primary Examiner*—Harvey C. Hornsby
*Assistant Examiner*—Brian Bowman

[57] ABSTRACT

In a gas turbine engine having a diffuser provided downstream of the power section and composed of inner and outer diffuser wall members forming therebetween a diffuser chamber which is open into an exhaust gas collector chamber, the outer diffuser wall member is provided with at least one flow guide member which extends on the generally frustoconical outer peripheral surface of the outer diffuser wall member and which is curved arcuately or circularly about the common center axis of the inner and outer diffuser wall members for thereby suppressing formation of vortices in the flow of the combustion gases being exhausted through the collector chamber.

2 Claims, 8 Drawing Figures

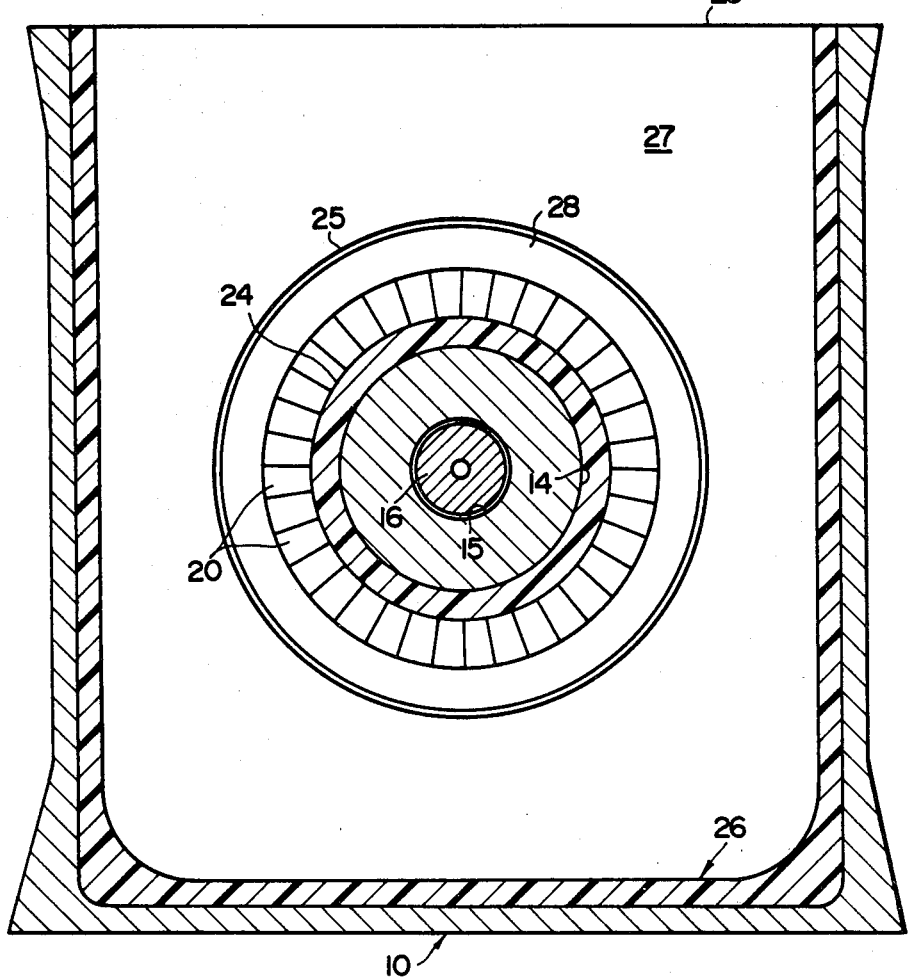

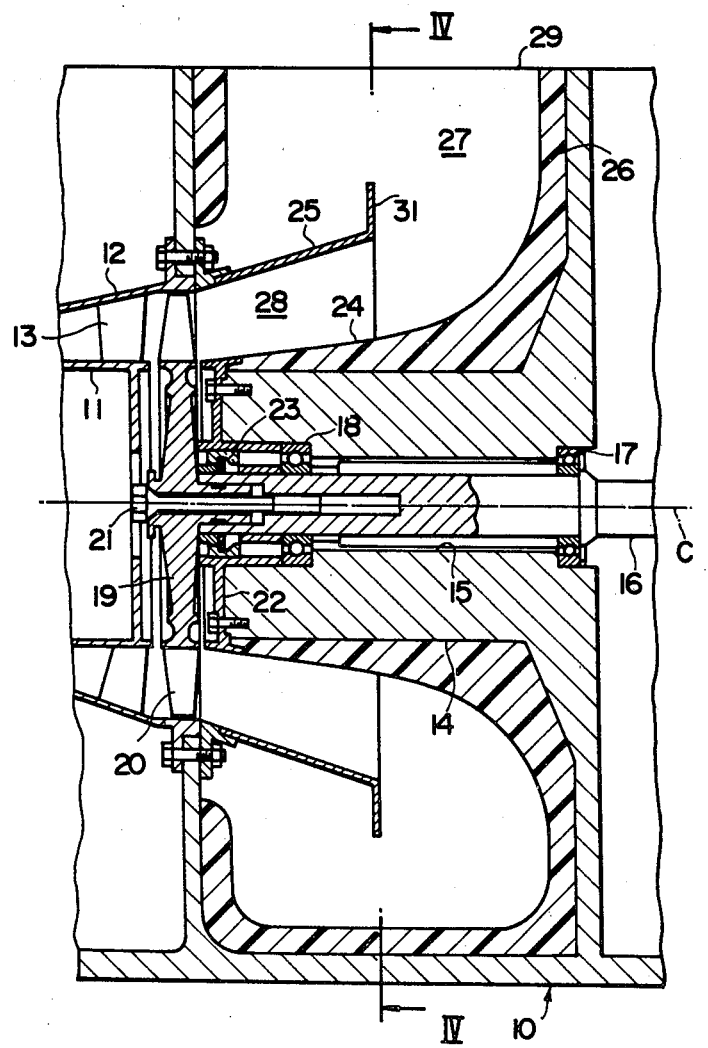

DIFFUSER AND EXHAUST GAS COLLECTOR ARRANGEMENT

FIELD OF THE INVENTION

The present invention relates in general to gas turbine engines and, particularly, to the improvement in the diffuser and exhaust gas collector arrangement of a gas turbine engine.

BRIEF DESCRIPTION OF THE PRIOR ART

As is well known in the art, a gas turbine engine comprises two operative sections consisting of a gas generation section for producing high-pressure, high-temperature combustion gases and a power section including a power turbine rotor adapted to be driven for rotation by the high-pressure combustion gases transfered from the gas generation section to the power section. To permit a circumferential discharge of the combustion gases from the power section, the gas turbine engine further comprises a diffuser constituted by inner and outer wall members having a common center axis. The inner and outer wall members of the diffuser are radially spaced apart from each other about the common center axis thereof and form therebetween a diffuser chamber having axially opposited gas inlet and outlet ends. The outer wall member of the diffuser has a generally frusto-conical outer peripheral surface axially enlarging in diameter from the gas inlet end toward the gas outlet end of the diffuser chamber. The outer wall member axially extends into an exhaust gas collector chamber having a gas discharge end directed substantially perpendicularly to the common center axis of the inner and outer wall members of the diffuser. The combustion gases which have been exhausted in the power section are passed through the diffuser chamber and are allowed to be discharged into the open air through this collector chamber.

In a prior-art diffuser and exhaust gas collector chamber arrangement of this nature, the flow of the combustion gases admitted from the diffuser chamber into the exhaust gas collector chamber forms large vortices in the collector chamber. The vortex flows thus produced in the exhaust gas collector chamber grow as the exhaust gases travel toward gas discharge end of the collector chamber. The atmospheric pressure occurring as a static pressure at the gas discharge end of the exhaust gas collector chamber is therefore induced into the central zones or "eyes" of the individual vortices and is thereby admitted deep into the collector chamber. Furthermore, in the outer peripheral zones of the vortices are developed increased gas pressures due to the centrifugal forces produced in these zones. Due to the increased gas pressures thus developed in the outer peripheral zones of the vortices, the pressures at the gas outlet end and accordingly at the gas inlet end of the diffuser chamber rise above the level of the atmospheric pressure. This causes a rise in the back pressure in the power section of the gas turbine engine and deteriorates the power output characteristics of the turbine engine. The present invention contemplates elimination of such a problem encountered in a prior-art diffuser and exhaust gas collector chamber arrangement of a gas turbine engine.

SUMMARY OF THE INVENTION

It is, accordingly, an object of the present invention to provide an improved diffuser and exhaust gas collector chamber arrangement adapted to suppress formation of vortex flows in the exhaust gas collector chamber of a gas turbine engine.

In accordance with the present invention, such an object is accomplished by a gas turbine engine comprising a diffuser composed of inner and outer wall members having a common center axis and radially spaced apart from each other for forming therebetween a diffuser chamber having an annular cross section and axially opposite gas inlet and outlet ends, the outer wall member having a generally frusto-conical outer peripheral surface axially enlarging in diameter from the gas inlet end toward the gas outlet end of the diffuser chamber, a stationary casing structure housing therein said diffuser to form an exhaust gas collector chamber surrounding the outer wall member of the diffuser and having a gas discharge end directed substantially perpendicularly to the common center axis of the inner and outer wall members of the diffuser, and flow stabilizer means including at least one flow guide member extending on the outer peripheral surface of the outer wall member of the diffuser and curved arcuately or circularly about the common center axis of the inner and outer wall members of the diffuser.

In one embodiment of the present invention, the above mentioned flow stabilizer means comprises a pair of ribs each constituting the aforesaid flow guide member, wherein the two ribs extend arcuately on the outer peripheral surface of the outer wall member of the diffuser and are preferably disposed substantially symmetrically with respect to a plane passing through the common center axis of the inner and outer wall members of the diffuser and directed toward the gas discharge end of the exhaust gas collector chamber.

In another embodiment of the present invention, the flow stabilizer means of the arrangement according to the present invention is consituted by an annular flange which is formed by the outer wall member of the diffuser along the circumferentially extending axial end of the outer wall member at the gas outlet end of the diffuser chamber and which radially projects outwardly from the above mentioned axial end of the outer wall member of the diffuser.

BRIEF DESCRIPTION OF THE DRAWINGS

The drawbacks which have thus far been inherent in the prior-art diffuser and exhaust gas collector chamber arrangements of gas turbine engines and the features of the diffuser and exhaust gas collector chamber arrangement according to the present invention will be more clearly understood from the following description taken in conjunction with the accompanying drawings, in which:

FIG. 1B is a cross sectional view taken along line I—I of FIG. 1A;

FIG. 4A is a view similar to FIG. 3A but shows another embodiment of the diffuser and exhaust gas collector chamber arrnagement according to the present invention.

DETAILED DESCRIPTION OF THE BACKGROUND OF THE INVENTION

Figure 1A:
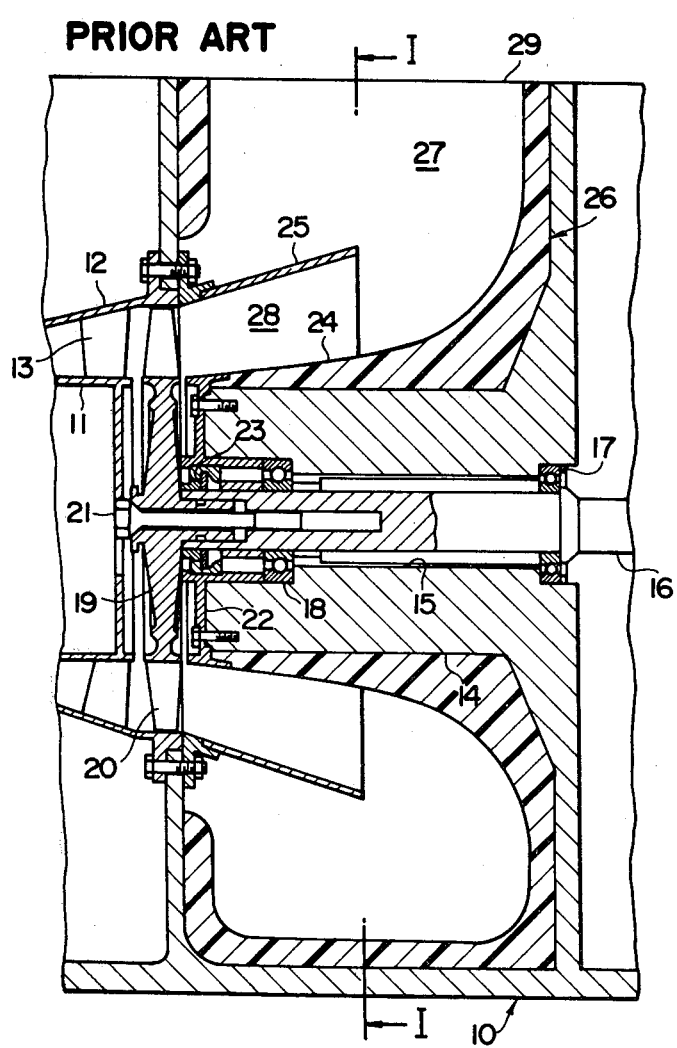
FIG. 1A is a longitudinal sectional view of a known diffuser and exhaust gas collector chamber arrangement of a gas turbine engine.

Referring to FIGS. 1A and 1B of the accompanying drawings, a prior-art diffuser and exhaust gas collector chamber arrangement is shown provided behind the power section of a gas turbine engine having a stationary casing structure 10. The power section comprises coaxial inner and outer shrouds 11 and 12 which are radially spaced apart from each other to form a primary diffuser chamber therebetween. The inner and outer shrouds 11 and 12 are connected together by a series of stationary, variable-angle, curved vanes 13 disposed at the downstream end of the primary diffuser chamber and forming a multiplicity of turbine nozzles therebetween.

The casing structure 10 has a cylindrical wall portion 14 axially projecting toward the rear end of the inner shroud 11. The wall portion 14 is formed with an axial bore 15 which is open at one end behind the rear end of the inner shroud 11 and at the other end at the rear end of the wall portion 14. A turbine output shaft 16 axially extends through this bore 15 and is journaled in bearings 17 and 18 supported in the bore 15. One of the bearings 17 and 18 is located adjacent the rear end of the bore 15 and the other of the bearings 17 and 18 is disposed in the neighbourhood of the front end of the bore 15. The turbine output shaft 16 axially projects slightly out of the bore 15 toward the rear end of the inner shroud 11 and has a rear extension connected to, for example, a gear which forms part of a reduction gear assembly (not shown).

Between the rear end of the inner shroud 11 and the front end of the wall portion 14 is positioned a disc-shaped power turbine rotor 19 carrying a series of curved vanes 20 around the outer peripheral edge of the rotor 19. The turbine rotor 19 is securely coupled to the turbine output shaft 16 by means of a center bolt 21 and is thus rotatable about the center axis of the shaft 16. The vanes 20 carried by the turbine rotor 19 are disposed at the rear of the vanes 13 fixed to the inner and outer shrouds 11 and 12. During operation of the turbine engine, the high-pressure, high-temperature combustion gases entering the power section strike against the stationary vanes 13 and are directed against the vanes 20 on the turbine rotor 19. The resulting high pressure of the gases impinging upon the vanes 20 on the turbine rotor 19 causes the rotor 19 to spin at high speeds about the center axis of the rotor 19 to put shaft 16, thereby driving the shaft 16 for rotation about the axis thereof.

Designated by reference numeral 22 in FIG. 1A is a bearing retainer securely attached to the front face of the wall portion 14 for retaining the bearing 18 in position by the aid of ring-shaped spacer elements. Designated further by numeral 23 is a mechanical contact seal provided between the bearing retainer 22 and a front end portion of the turbine output shaft 16.

To permit a circumferential discharge of the combustion gases exhausted in the power section, the gas turbine further comprises an exhaust diffuser constituted by an inner diffuser wall member 24 and an outer diffuser wall member 25. The inner diffuser wall member 24 is herein assumed, by way of example, as forming part of a heat insulating layer 26 which in part surrounds the outer peripheral surface of the cylindrical wall portion 14 of the casing structure 10 and in part attached to the inner surfaces of the casing structure 10 which form an exhaust gas collector chamber 27.

The inner diffuser wall member 24 has an outer peripheral surface flaring rearwardly away from the front end of the wall portion 14 of the casing structure 10. On the other hand, the outer diffuser wall member 25 has generally frusto-conical inner and outer peripheral surfaces enlarging in diameter rearwardly away from the vanes 20 on the turbine rotor 19 and is securely connected at its reduced front end to the casing structure 10. The inner and outer diffuser wall members 24 and 25 thus configured have a common center axis coincident with the center axis of the turbine output shaft 16 and are radially spaced apart from each other for forming therebetween a diffuser chamber 28 having an annular cross section. The diffuser chamber 28 has axially opposite gas inlet and outlet ends which consist of a front gas inlet end which is open immediately at the rear of the vanes 20 on the turbine rotor 19 and a rear gas outlet end which is open at the rear end of the outer diffuser wall member 25.

The outer diffuser wall member 25 extends into and is surrounded by the exhaust gas collector chamber 27 so that the diffuser chamber 28 is open rearwardly to the collector chamber 27 through the rear gas outlet end of the diffuser chamber 28. The exhaust gas collector chamber 27 has a gas discharge end 29 open to the atmosphere and directed substantially perpendicularly to the common center axis of the inner and outer diffuser wall members 24 and 25, as will be seen from FIGS. 1A and 1B.

Figure 2A:
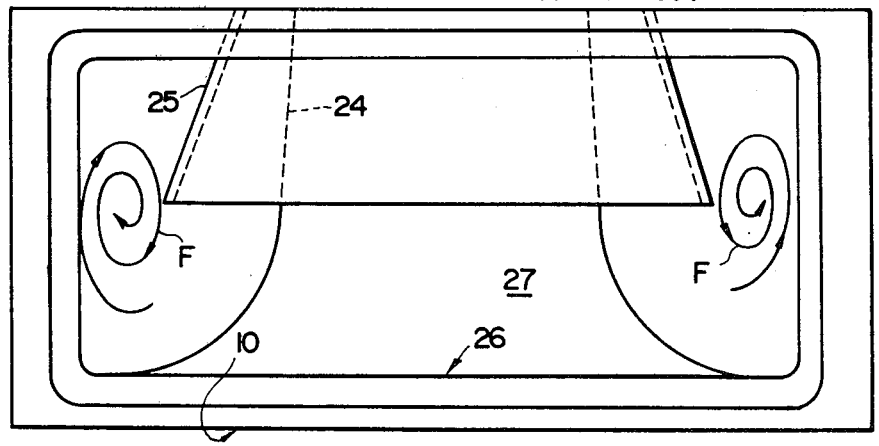
FIG. 2A is a top plan view of the prior-art diffuser and exhaust gas collector chamber arrangement of FIGS. 1A and 1B and schematically shows the vortex flows produced in the exhaust gas collector chamber therein.
Figure 2B:
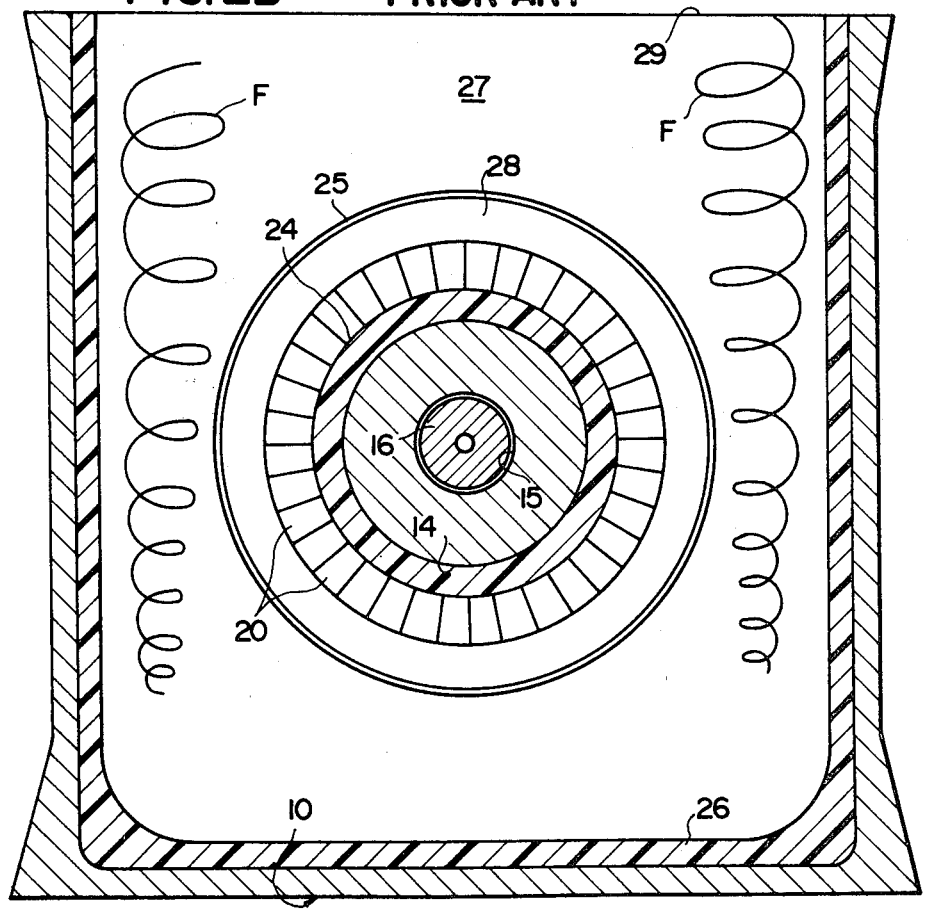
FIG. 2B is a view similar to FIG. 1B but shows the vortex flows produced in the exhaust gas collector chamber illustrated in FIG. 2A.

In the diffuser and exhaust gas collector chamber arrangement above described, the flow of the combustion gases admitted form the diffuser chamber 28 into the exhaust gas collector chamber 27 during operation of the gas turbine engine forms a number of large vortices in the collector chamber 27 as indicated by F in FIGS. 2A and 2B. The vortex flows F thus produced in the exhaust gas collector chamber 27 grow as the exhaust gases travel toward the gas discharge end 29 of the collector chamber 27. The atmospheric pressure occurring as a static pressure at the gas discharge end 29 of the collector chamber 27 is therefore induced into the central zones of the individual vortex flows F and is thereby admitted deep into the collector chamber 27.

Furthermore, in the outer peripheral zones of the vortex flows F are developed increased gas pressures due to the centrifugal forces produced in these zones of the vortex flows F. The increased gas pressures thus developed in the outer peripheral zones of the vortex flows F tend to give rise to an increase in the gas pressure at the gas outlet end and accordingly the gas inlet end of the diffuser chamber 28. The gas pressure at the inlet end of the diffuser chamber 28 being increased above the level of the atmospheric pressure, there is caused an increase in the back pressure in the power section of the turbine engine. This in turn causes deterioration in the power output performance of the turbine engine. The present invention aims at resolution of such a problem encountered in a prior-art diffuser and exhaust gas collector chamber arrangement of the nature hereinbefore described with reference to FIGS. 1A and 1B.

DESCRIPTION OF THE EMBODIMENTS OF THE INVENTION

FIGS. 3A, 3B, 4A and 4B show the embodiments of the diffuser and exhaust gas collector chamber arrangement according to the present invention. The embodiments herein illustrated are assumed, by way of example, to be constructed basically similarly to the prior-art arrangement hereinbefore described with reference to FIGS. 1A and 1B. Thus, each of the embodiments shown in FIGS. 3A to 4B comprises members and structures which are similar to those of the prior-art arrangement of FIGS. 1A and 1B and which are, accordingly, designated by the same reference numerals as those allocated to the members and structures of the arrangement of FIGS. 1A and 1B.

Each of the embodiments illustrated in FIGS. 3A to 4B further comprises flow stabilizer means including at least one flow guide member which extends on the outer peripheral surface of the outer wall member 25 of the diffuser and which is curved arcuately or circularly about the common center axis of the inner and outer wall members 24 and 25 of the diffuser.

Figure 3A:
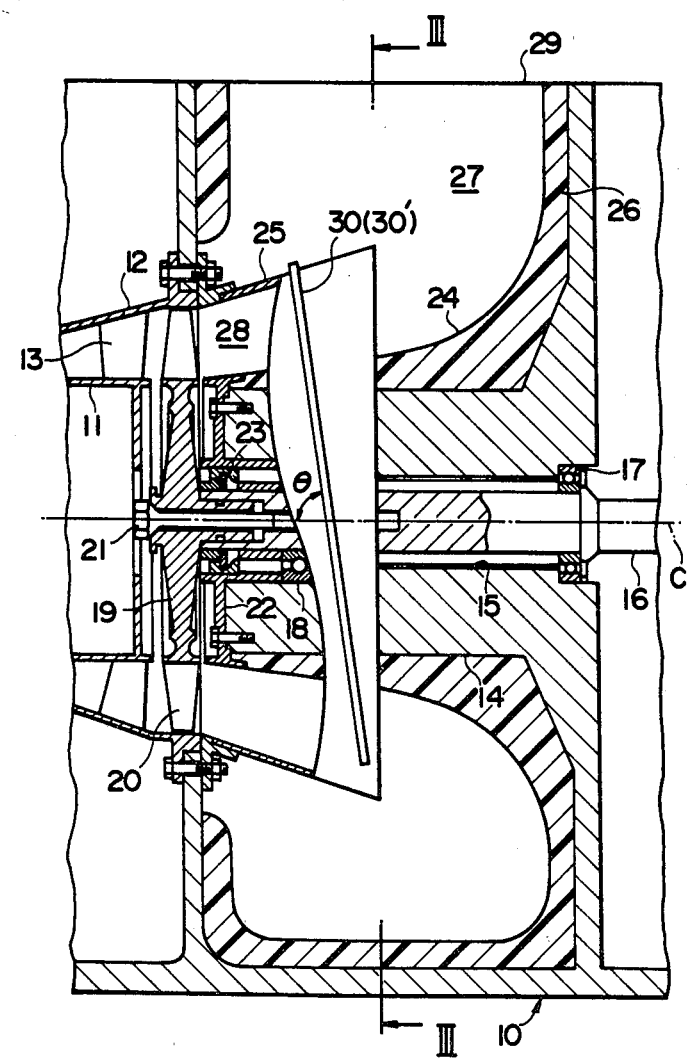
FIG. 3A is a longitudinal sectional view showing an embodiment of the diffuser and exhaust gas collector chamber arrangement according to the present invention.
Figure 3B:
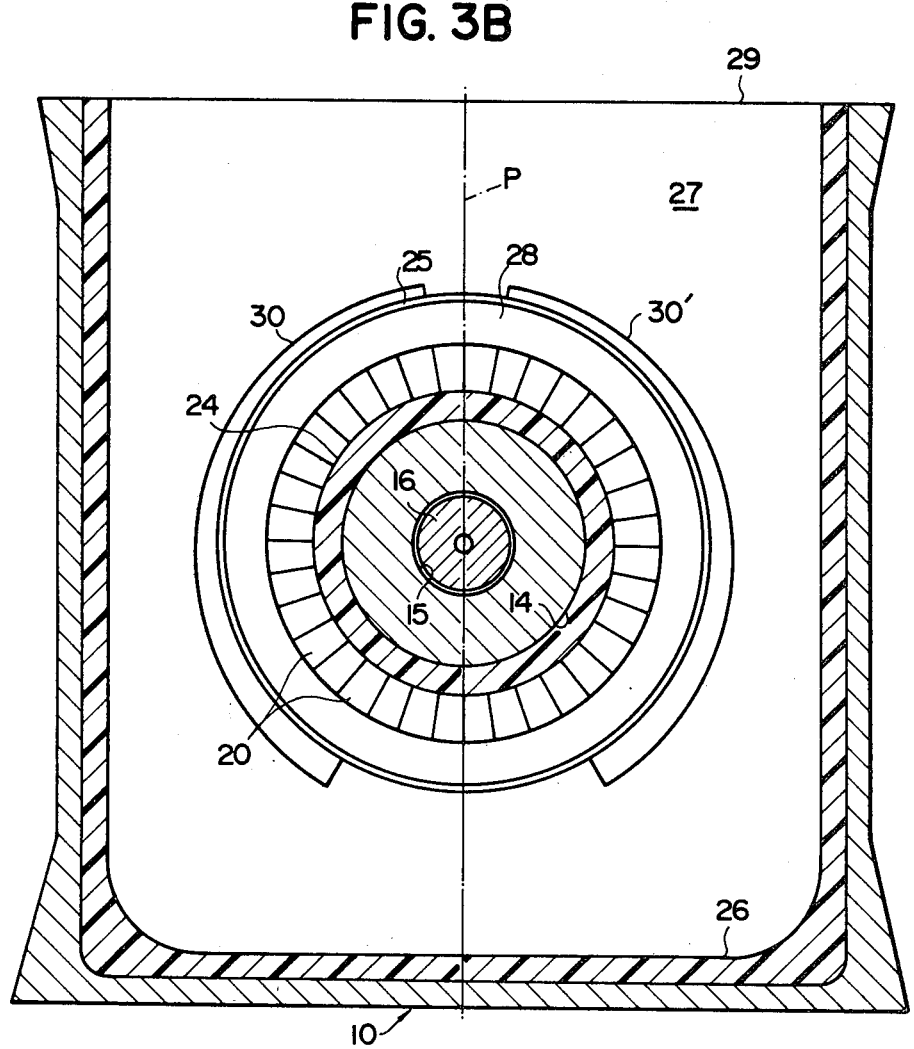
FIG. 3B is a cross sectional view taken along line III—III of FIG. 3A.

In the embodiment of FIGS. 3A and 3B, such flow stabilizer means is shown comprising a pair of ribs 30 and 30' which extend arcuately on the outer peripheral surface of the outer diffuser wall member 25. The ribs 30 and 30' are disposed substantially symmetrically with respect to a plane (indicated at P in FIG. 3B) passing through the common center axis (indicated at C in FIG. 3A) of the wall members 24 and 25 and directed toward the gas discharge end 29 of the exhaust gas collector chamber 27. Each of the ribs 30 and 30' preferably has an outer peripheral end having a radius of curvature which is gradually reduced toward the gas discharge end 29 of the exhaust gas collector chamber 27 as will be seen from FIG. 3B and extends on a plane inclined at a predetermined angle (indicated at $\theta$ in FIG. 3A) with respect to the common center axis C of the inner and outer diffuser wall members 24 and 25. Experiments show that it is advisable that the angle $\theta$ be within the range of between about 90 degrees and about 55 degrees.

With the provision of the ribs 30 and 30' on the outer peripheral surface of the outer diffuser wall member 25, the combustion gases admitted into the exhaust gas collector chamber 27 from the diffuser chamber 28 are guided to flow along the ribs 30 and 30' toward the gas discharge end 29 of the collector chamber 27 and are therefore prevented from forming the vortices F which would otherwise be produced as illustrated in FIGS. 2A and 2B. As a consequence, the atmospheric pressure occurring as a static pressure at the gas discharge end 29 of the exhaust gas collector chamber 27 is prevented form entering the collector chamber 27. Because, there is no differential pressure which would otherwise be developed between the central and peripheral zones of a vortex, the static pressure at the gas outlet end of the diffuser chamber 28 can be maintained at a subatmospheric level and for this reason the back pressure in the power section of the turbine engine can be reduced significantly. The reduction in the back pressure of the power section will result in an increase in the pressure recovery factor available of the gas turbine engine.

Figure 4B:
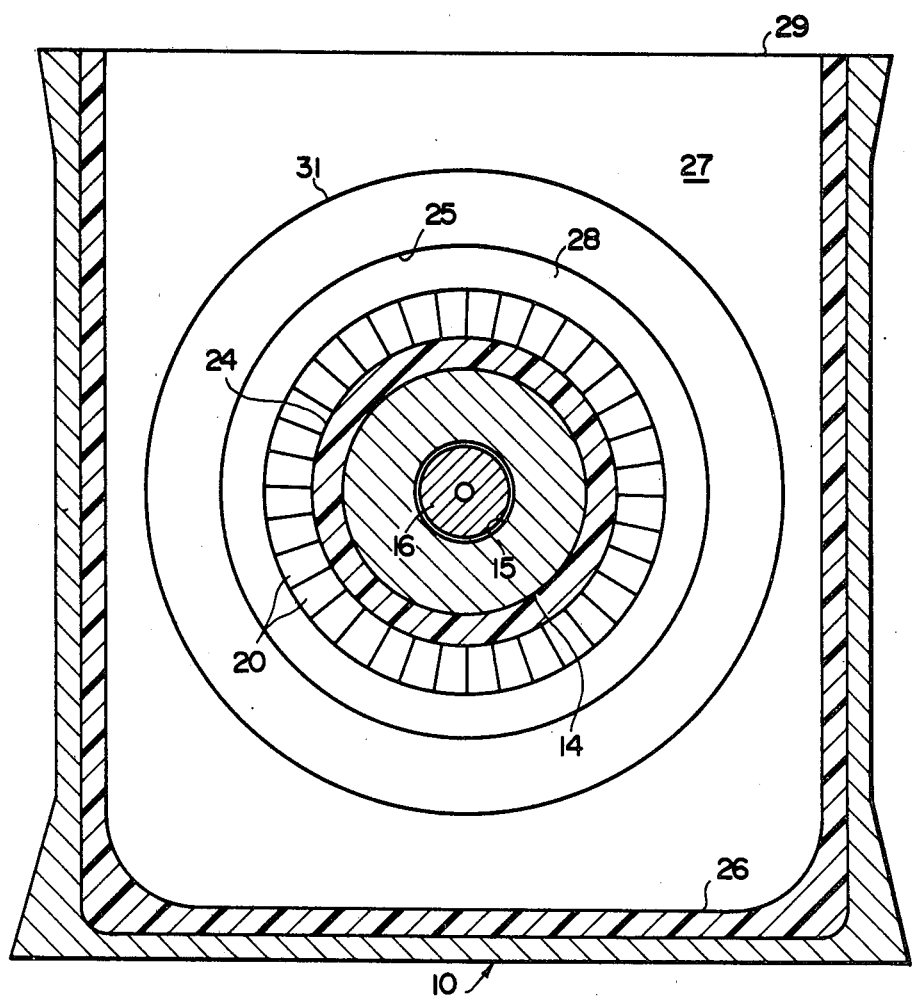
FIG. 4B is a cross sectional view taken along line IV—IV of FIG. 4A.

In the embodiment of FIGS. 4A and 4B, the flow stabilizer means featuring the arrangement according to the present invention is illustrated as being constituted by an annular flange 31 formed by the outer diffuser wall member 25 along the circumferentially extending rear axial end of the wall member 25 at the gas outlet end of the diffuser chamber 28. The annular flange 31 radially projects outwardly from the rear axial end of the wall member 25 preferably substantially at tight angles with respect to the common center axis (indicated at C in FIG. 4A) of the inner and outer diffuser wall members 24 and 25. It will be apparent the flow stabilizer means thus constituted by the annular flange 31 of the outer diffuser wall member 25 is capable of taking effect similarly to the flow stabilizer means constituted by the ribs 30 and 30' provided in the embodiment of FIGS 3A and 3B. In addition to such an effect, the annular flange 31 constituting the flow stabilizer means of the embodiment of FIGS. 4A and 4B is conducive to reducing the production cost of a gas turbine engine since the same is constructed as an integral portion of the diffuser wall member 25.

From the foregoing description, it will have been appreciated that formation of vortex flows in the exhaust gas collector chamber of a gas turbine engine can be suppressed and accordingly the pressure recovery factor available of the turbine engine can be enhanced by procision of the flow stabilizer means having a simple construction. Because, furthermore, of the fact that the pressure recovery factor of a gas turbine engine can be increased simply by provision of at least one flow guide member on the outer peripheral surface of the outer wall member of the diffuser, the axial measurement of the diffuser structure can be reduced without sacrificing the power output performance of the turbine engine. The improvement according to the present invention results in reason expected to lead itself to reduction of the overall size and weight a gas turbine engine as a whole.

What is claimed is:

1. A gas turbine engine comprising a diffuser composed of inner and outer wall members having a common center axis and radially spaced apart from each other for forming therebetween a diffuser chamber having an annular cross section and axially opposite gas inlet and outlet ends, the outer wall member having a generally frusto-conical peripheral surface axially enlarging in diameter from the gas inlet toward the gas outlet end of the diffuser chamber, a stationary casing structure housing therein said diffuser to form an exhaust gas collector chamber surrounding said outer wall member and having a gas discharge end directed substantially perpendicularly to said common center axis, and a pair of ribs extending arcuately on the outer peripheral surface of said outer wall member and curved about said center aixs, wherein each of said ribs has an outer peripheral end extending with a radius of curvature which is gradually reduced toward said gas discharge end of said exhaust collector chamber.

2. A gas turbine engine as set forth in claim 1, wherein each of said ribs extends on a plane inclined at an angle within the ranges of between about 90 degrees and about 55 degrees and has an outer peripheral end extending with a radius of curvature which is gradually reduced toward said gas discharge end of said exhaust gas collector chamber.

* * * * *